United States Patent
Vedantham et al.

(10) Patent No.: US 9,584,185 B2
(45) Date of Patent: Feb. 28, 2017

(54) RELATIVE PHASE DETECTION IN POWER LINE COMMUNICATIONS NETWORKS

(71) Applicant: Texas Instruments Incorporated, Dallas, TX (US)

(72) Inventors: Ramanuja Vedantham, Allen, TX (US); Anand Dabak, Plano, TX (US); Kumaran Vijayasankar, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1067 days.

(21) Appl. No.: 13/659,536

(22) Filed: Oct. 24, 2012

(65) Prior Publication Data
US 2013/0101003 A1    Apr. 25, 2013

Related U.S. Application Data

(60) Provisional application No. 61/550,777, filed on Oct. 24, 2011.

(51) Int. Cl.
*H02J 1/00* (2006.01)
*H02J 3/00* (2006.01)
*H04B 3/54* (2006.01)

(52) U.S. Cl.
CPC ......... *H04B 3/54* (2013.01); *H04B 2203/542* (2013.01); *H04B 2203/5408* (2013.01); *H04B 2203/5433* (2013.01)

(58) Field of Classification Search
CPC ......... H04L 27/28; H04L 27/00; H04L 12/10; H04B 3/00; H04B 1/69; H04B 1/38; G08B 1/08

USPC ........ 307/1, 2, 64, 66, 80, 39; 340/538, 540, 340/542; 375/257, 295

See application file for complete search history.

(56) References Cited

U.S. PATENT DOCUMENTS

| | | | | |
|---|---|---|---|---|
| 7,893,680 | B2* | 2/2011 | Thurlow | H02M 5/2576 323/300 |
| 2007/0222578 | A1* | 9/2007 | Iwamura | G08B 25/04 340/538 |
| 2009/0072954 | A1* | 3/2009 | Kim | H04B 3/54 375/285 |
| 2010/0316140 | A1* | 12/2010 | Razazian | H04B 3/54 375/257 |

* cited by examiner

*Primary Examiner* — Rexford Barnie
*Assistant Examiner* — Jagdeep Dhillon
(74) *Attorney, Agent, or Firm* — Rose Alyssa Keagy; Charles A. Brill; Frank D. Cimino

(57) ABSTRACT

Systems and methods for relative phase detection and zero crossing detection for power line communications (PLC) are described. In some embodiments, both transmit and receive PLC devices detect a zero crossing on an AC mains phase. The devices start a phase detection counter (PDC) by generating a zero crossing pulse within 5% of the actual zero crossing time. When a frame is transmitted, the transmitting device includes a PDC value in the frame control header (FCH). The PDC value corresponds to the start time of the FCH. When the frame is received at the receive PLC device, the receive PLC device measures a local PDC value between the zero crossing and the start of the FCH. The receive device compares the local PDC value to the PDC value in the FCH of the received frame and determines if the devices are on the same phase.

13 Claims, 6 Drawing Sheets

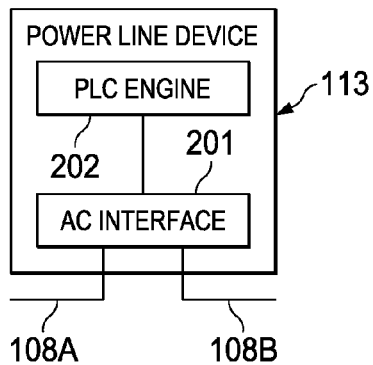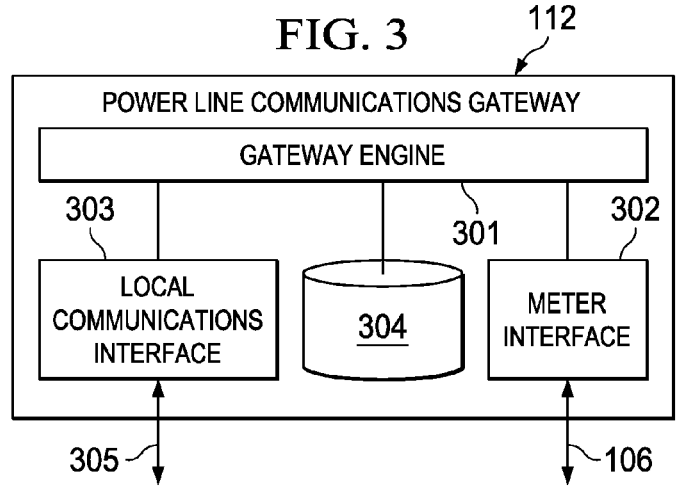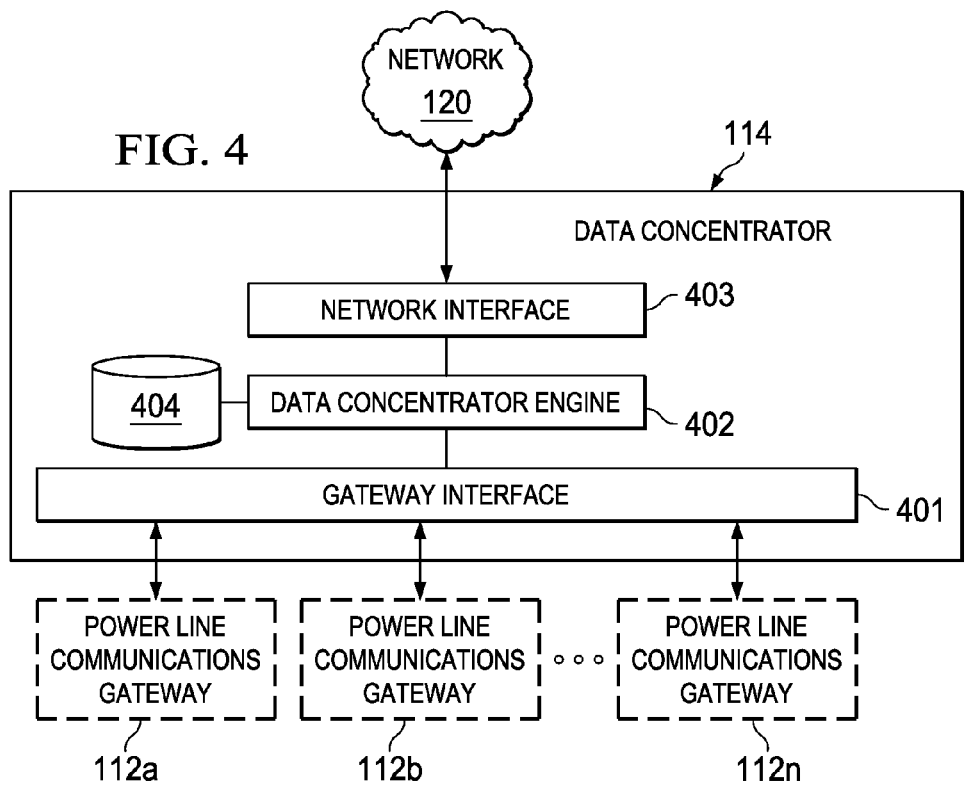

RELATIVE PHASE DETECTION IN POWER LINE COMMUNICATIONS NETWORKS

CROSS-REFERENCE TO RELATED APPLICATION(S)

This application claims the benefit of the filing date of U.S. Provisional Patent Application No. 61/550,777, which is titled "Relative Phase Detection" and was filed on Oct. 24, 2011, the disclosure of which is hereby incorporated by reference herein in its entirety.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, lighting, and solar.

Using PLC to communicate with utility meters enables applications such as Automated Meter Reading (AMR) and Automated Meter Infrastructure (AMI) communications without the need to install additional wires. $Consume_{++rs}$ may also use PLC to connect home electric meters to an energy monitoring device or in-home display monitor their energy consumption and to leverage lower-cost electric pricing based on time-of-day demand.

As the home area network expands to include controlling home appliances for more efficient consumption of energy, OEMs may use PLC to link these devices and the home network. PLC may also support home and industrial automation by integrating intelligence into a wide variety of lighting products to enable functionality such as remote control of lighting, automated activation and deactivation of lights, monitoring of usage to accurately calculate energy costs, and connectivity to the grid.

PLC may also serve as an important enabling technology for the mass deployment of solar equipment by providing a communication channel to solar inverters for monitoring and managing power across the grid by utility companies. While radio frequency (RF) communications have made some progress in solar installations, PLC offers an ideal means for connecting equipment with high reliability and at a low cost on DC or AC lines.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-B, C, D bands are open for end user applications, which may include PLC users. Typically, PLC systems operate between 35-90 kHz in the CENELEC A band using 36 tones spaced 1.5675 kHz apart. In the United States, the FCC defines a single wide band from 10 to 535 kHz; however, PLC systems typically operate at 154-487.5 kHz using seventy-two tones spaced at 4.6875 kHz apart. In other parts of the world different frequency bands are used, such as the Association of Radio Industries and Businesses (ARIB)-defined band in Japan, which operates at 10-450 kHz, and the Electric Power Research Institute (EPRI)-defined bands in China, which operates at 3-90 kHz.

SUMMARY

Systems and methods for implementing zero crossing detection and phase detection in power line communications (PLC) are described. In an illustrative embodiment, a method performed by a PLC device, such as a PLC meter or data concentrator may include starting a phase detection counter (PDC) upon detecting a zero crossing on a phase of an AC mains. The PLC device then determines a PDC value at a frame transmission time. The PDC value represents a duration between the zero crossing and the start of a PHY frame control header (FCH) transmission in a frame. The PLC device creates a frame for transmission to a remote PLC device. The frame includes an FCH with the PDC value. The frame is then transmitted on the phase of the AC mains.

The PLC device generates a zero crossing pulse upon detection of the zero crossing. The center of the zero crossing pulse occurs within an error limit of an actual zero crossing on the AC mains. A period on the AC mains is determined by zero crossings of a waveform carried on the AC mains phase. The PLC device may generate the zero crossing pulse with an error limit that is ±5% of period on the AC mains.

In another example embodiment, a method performed by a PLC device, such as a PLC meter or data concentrator may include starting a phase detection counter (PDC) upon detecting a zero crossing on a phase of an AC mains. The PLC device receives a frame from a remote PLC device. The frame includes an FCH, for example, with a transmit PDC value set by a transmitting node. The PLC device determines a receive PDC value at the time the frame is received. The receive PDC value represents a duration between the zero crossing and the start of a PHY FCH transmission in the received frame. The PLC device determines a PDC difference between the receive PDC value and the transmit PDC value.

It can then be determined whether the PLC device and the remote PLC device are on a same AC mains based upon the PDC difference. The PLC device and the remote PLC device are determined to be on the same AC mains when the PDC difference is below a predetermined threshold. The PLC device and the remote PLC device are determined to be not on the same AC mains when the PDC difference is above a predetermined threshold.

The receiving PLC device generates a zero crossing pulse upon detection of the zero crossing. The center of the zero crossing pulse occurs within an error limit of an actual zero crossing on the AC mains. For example, the zero crossing pulse may represent the occurrence of the zero crossing to an accuracy of ±5%. The zero crossing pulse used to start the PDC In some embodiments, one or more of the methods described herein may be performed by one or more PLC devices (e.g., a PLC meter, PLC data concentrator, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE DRAWINGS

Figure 1:
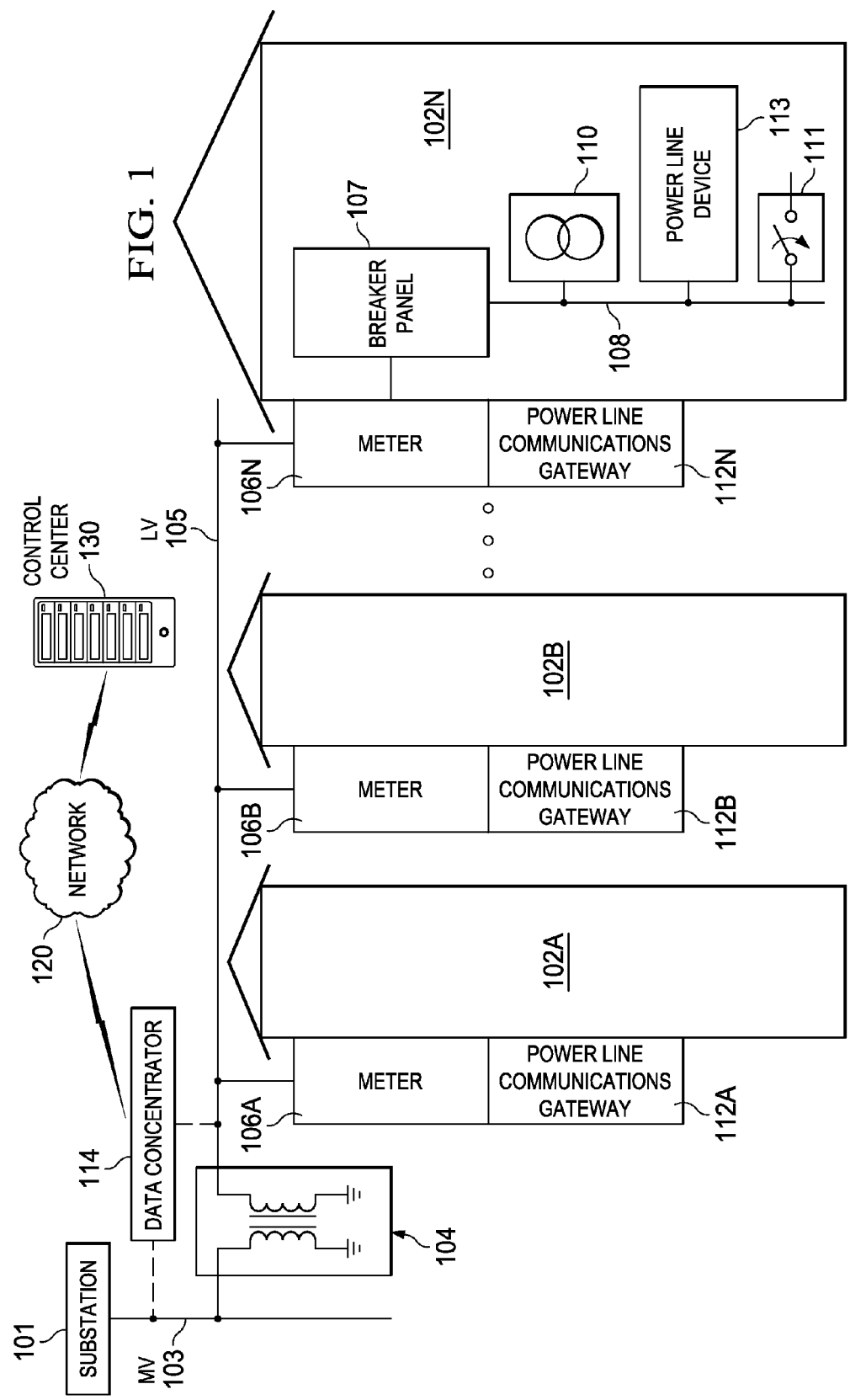

Having thus described the invention(s) in general terms, reference will now be made to the accompanying drawings, wherein:

FIG. 1 is a diagram of a PLC system according to some embodiments.

FIG. 2 is a block diagram of a PLC device or modem according to some embodiments.

FIG. 3 is a block diagram of a PLC gateway according to some embodiments.

FIG. 4 is a block diagram of a PLC data concentrator according to some embodiments.

Figure 5:
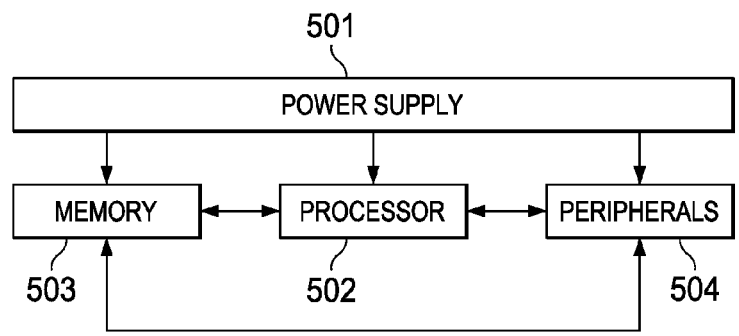

FIG. 5 is a block diagram of a PLC device according to some embodiments.

Figure 6:
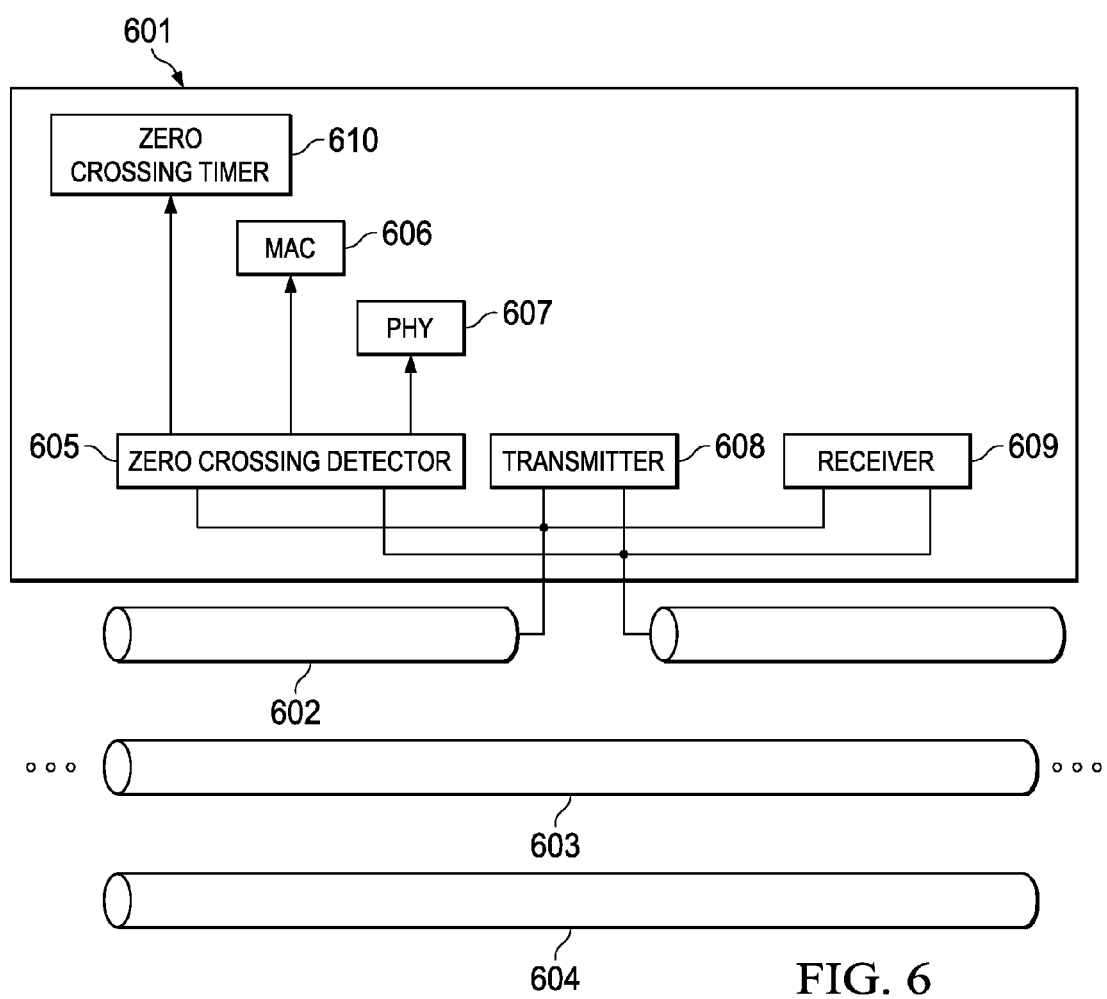

FIG. 6 is a block diagram illustrating components a PLC device that is coupled to one phase of a PLC network.

Figure 7:
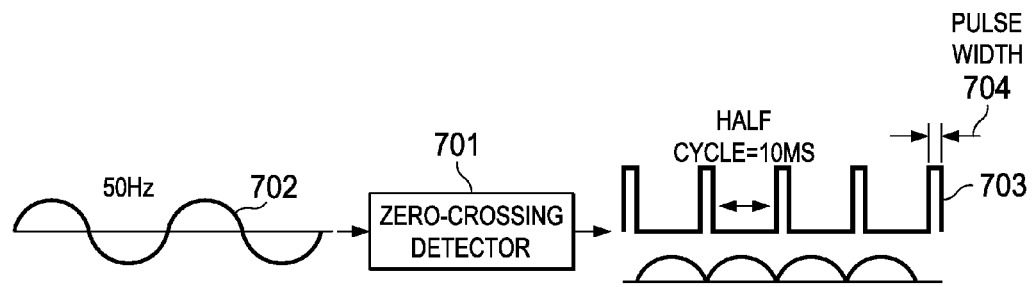

FIG. 7 illustrates the characteristics of a zero crossing detector according to one embodiment.

Figure 8:
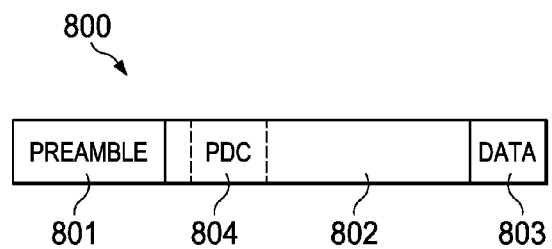

FIG. 8 illustrates a frame transmitted between nodes according to one embodiment.

Figure 9:
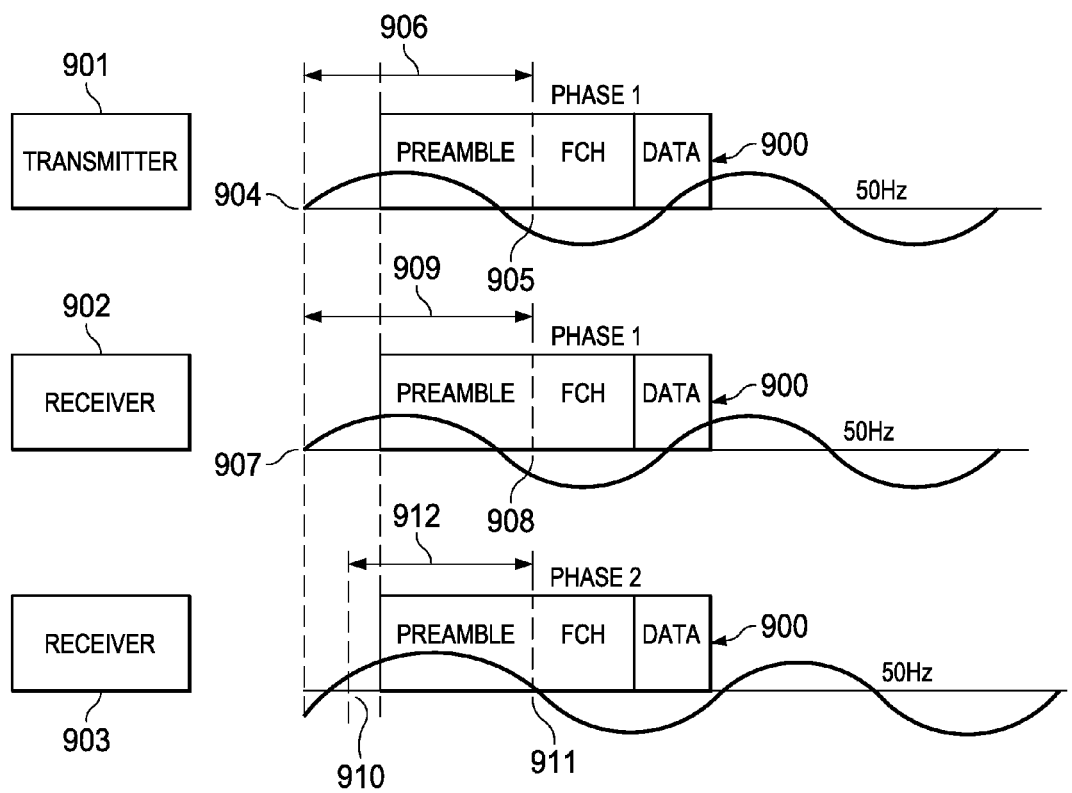

FIG. 9 illustrates the transmission of a frame by a transmitting node and the reception of the frame at two different receiver nodes.

Figure 10:
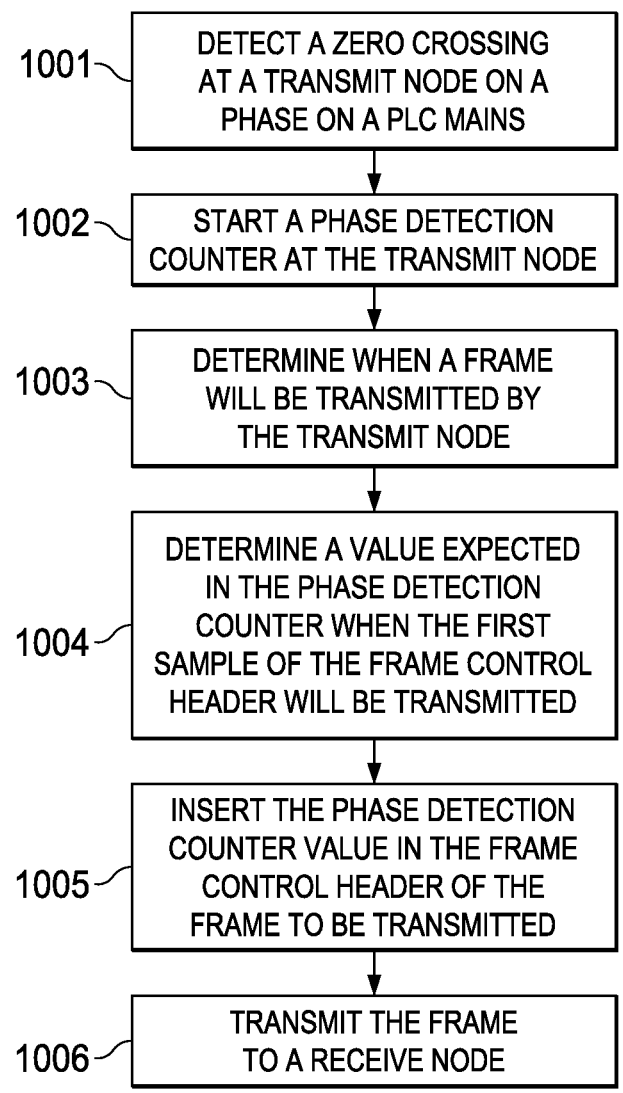

FIG. 10 is a flowchart illustrating a method for calculating the PDC value that should be inserted in the FCH of a transmit frame.

Figure 11:
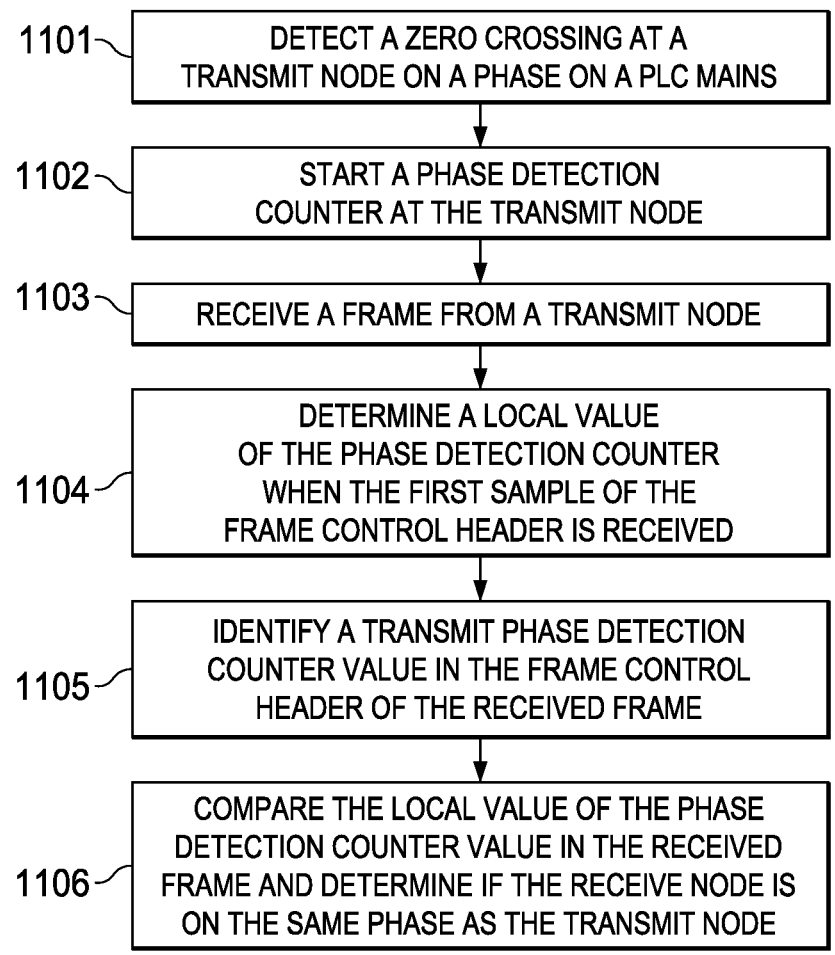

FIG. 11 is a flowchart illustrating a method of determining if a receive node and a transmit node are on the same phase of a PLC mains.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

FIG. 1 illustrates a power line communication (PLC) system according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, electric vehicle charging station, or other location where electric power is received and/or consumed. A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, by the PRIME, G3 or IEEE 1901 standards.

PLC modems or gateways 112a-n at residences 102a-n use the MV/LV power grid to carry data signals to and from PLC data concentrator or router 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

FIG. 4 is a block diagram of PLC data concentrator or router 114 according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

FIG. 5 is a block diagram of a circuit for implementing PLC communications and channel estimation according to some embodiments. In some cases, one or more of the devices and/or apparatuses shown in FIGS. 1-4 may be implemented as shown in FIG. 5. In some embodiments, processor 502 may be a digital signal processor (DSP), an application specific integrated circuit (ASIC), a system-on-chip (SoC) circuit, a field-programmable gate array (FPGA), a microprocessor, a microcontroller, or the like. Processor 502 is coupled to one or more peripherals 504 and external memory 503. In some cases, external memory 503 may be used to store and/or maintain databases 304 and/or 404 shown in FIGS. 3 and 4. Further, processor 502 may include a driver for communicating signals to external memory 503 and another driver for communicating signals to peripherals 504. Power supply 501 provides supply voltages to processor 02 as well as one or more supply voltages to memory 503 and/or peripherals 504. In some embodiments, more than one instance of processor 502 may be included (and more than one external memory 503 may be included as well).

Peripherals 504 may include any desired circuitry, depending on the type of PLC system. For example, in an embodiment, peripherals 504 may implement local communication interface 303 and include devices for various types of wireless communication, such as WI-FI, ZIGBEE, BLUETOOTH, cellular, global positioning system, etc. Peripherals 504 may also include additional storage, including RAM storage, solid-state storage, or disk storage. In some cases, peripherals 504 may include user interface devices such as a display screen, including touch display screens or multi-touch display screens, keyboard or other input devices, microphones, speakers, etc.

External memory 503 may include any type of memory. For example, external memory 503 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 503 may include one or more memory modules to which the memory devices are mounted, such as single inline memory modules (SIMMs), dual inline memory modules (DIMMs), etc.

It will be understood that in various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

AC Mains Phase Detection

The AC mains in a PLC network carry three phases, which are sinusoidal waveforms with a phase shift of 120° from each other. Each sinusoidal waveform has a half cycle is equal to 10 ms in a 50 Hz PLC network or 8.33 ms in a 60 Hz PLC network.

In PLC systems, it is necessary to know which AC phase each PLC device is placed on. The AC phase information may be used for Advanced Metering Management (AMM) and other applications. AC phase detection is used to estimate, and track, the relative phase difference between two nodes in the PLC network. The AC phase information is stored in each PLC device's neighbor table or management information base (MIB), which includes information about all the devices within a Personal Operating Space (POS). AC phase information is useful at a system level, for example, to check for unexpected losses on the distribution line.

FIG. 6 is a block diagram illustrating components a PLC device 601 that is coupled to one phase 602 of a PLC network. Other PLC devices in the system may be coupled to other phases 603, 604. Each phase 602-604 carries a 50 Hz or 60 Hz sinusoidal waveform. A zero-crossing detector 605 in PLC device 601 detects when the waveform on phase 602 crosses zero volts. The zero-crossing detector 605 then delivers an output pulse (zero-crossing detection signal) that is based on the transition through zero volts. The zero-crossing detection signal is sent to the MAC 606 and PHY 607 in PLC device 601.

This output pulse from the zero-crossing detector may be used to synchronize transmitter 608 and a receiver 609 in the PLC device 601. The transmitter 608 generates a time stamp based on an internal counter at the instant a packet is transmitted. The receiver 609 provides its own time stamp at the instant the packet is received. The receiver 609 computes the delay and phase difference between the transmitter and the receiver.

To compute the phase difference, the following procedure is used. All PLC devices, including meters and data concentrator, have an internal timer that is synchronized to the zero-crossing detector. The zero-crossing detector 605 in each device 601 delivers an output pulse having a pulse width that is 5% of the total period.

FIG. 7 illustrates the characteristics of a zero crossing detector 701 according to one embodiment. Zero crossing detector 701 receives sinusoidal wave 702 from the power line. Zero crossing detector 701 outputs pulse signals 703 corresponding to the zero voltage transition on the power line. The individual output pulses 703 have a pulse width 704 that is 5% of the total period.

The relative phase detection described above allows a node to identify the relative phase difference between frame reception at itself and at any other device. Current PLC standards, such as the IEEE P1901.2 specification, have two major shortcomings associated with phase detection as described above. First, a reference point for the relative phase detection between two nodes has not been clearly specified. Second, the level of accuracy needed for the zero crossing detector (in addition to the pulse width) is not specified.

FIG. 8 illustrates a frame 800 transmitted between nodes according to one embodiment. Frame 800 comprises a preamble 801, Frame Control Header (FCH) 802, and payload data 803. The FCH 802 includes an eight-bit Phase Detection Counter (PDC) field 804. The one-byte PDC value 804 counts from 0 to 255 in one-half period of the main. For example, the PDC ticks represent a time resolution of 10/255 ms for a 50 Hz main and 8.33/255 ms for a 60 Hz main.

Reference Point for Phase Detection.

A common reference point is needed for both the transmitter and receiver nodes for phase detection. The PDC count is used for calculating the duration following a zero crossing. The PDC starts counting in both the transmitter and receiver when the zero crossing is detected. The transmitter and receiver must both use the same end point to determine their respective PDC counts for comparison. A segment within a frame 800 sent from a transmitter node to a receiver node can be used to identify this PDC count reference point. Each node may use an agreed-upon event within the frame as identifying the point when a PDC value should be selected. For example, there are three major segments of a typical PLC frame—a preamble, a PHY FCH, and a data payload. The beginning of any of these segments may be used as the point at which the PDC count is selected. In other embodiments, a sub-segment or sub-field of one of these segments, such as a field within the preamble, PHY FCH, or data payload, may be used as the measurement reference point. Accordingly, the PDC is initialized and starts counting at a zero crossing, and the PDC count value is captured at the agreed-upon reference point.

In one embodiment, the start of the FCH 802 may be used as the reference point. A PDC measurement may be calculated that corresponds to the first sample of the FCH 802. This PDC value may then be embedded into the frame, such as within a PDC value field 804 in the FCH 802, by the transmitter node. The value embedded in the PDC field 804 corresponds to the number of PDC counts at the first sample of the FCH 802 since the previous zero crossing duration at the transmitter. Any node receiving this frame would use the start of the received FCH 802 as the reference point to calculate its own PDC count since the last zero crossing at the receiver. The receiving node's PDC value at the time the FCH is received is compared with the PDC counter value 804 in the FCH 802 to determine if the transmitter node is in the same phase as the receiving node.

FIG. 9 illustrates the transmission of a frame 900 by a transmitting node 901 and the reception of the frame 900 at two different receiver nodes 902, 903. Using the example of a 50 Hz mains, receiver node 902 is in phase (Phase 1) with the transmitter node 901, but receiver node 903 has a relative phase difference (Phase 2). In one embodiment, transmitter 901 may be a data concentrator or other controller that transmits on one or more phases of a power line network, and receivers 902 and 903 may be meters or other nodes that are coupled to one phase of the power line network. The data concentrator and meters exchange data and commands using frames 900, for example. In other embodiments, the transmitter may be a meter or other node in a PLC network.

At the transmitter node 901, the mains zero crossing occurs at time 904 and the first sample of the FCH in frame 900 is transmitted starting at time 905. The PDC counts the interval 906 and inserts that value in the PDC field of the FCH in frame 900. The PDC count inserted into frame 900 may be a duration 906 that is expected for this frame, or a duration 906 observed for a prior frame. At receiver node 902, the mains zero crossing occurs at time 907. The phase detector counter in node 902 begins counting at that time 907 and PDC value 909 is determined when the receiver node 902 receives the FCH of frame 900 at time 908. At receiver node 903, the mains zero crossing occurs at time 910. The phase detector counter in node 903 begins counting at that time 910 and PDC value 912 is determined when the receiver node 903 receives the FCH of frame 900 at time 911. As illustrated in FIG. 9, transmitter node 901 and receiver node 902 are on the same phase and have approximately the same PDC count 906, 909. Conversely, transmitter 901 and receiver 903 are on different phases and have different PDC count values.

Accuracy of the Zero Crossing Detector.

With regard to the accuracy needed for the zero crossing detector, the current standard allows for ±10% of error in detecting the actual zero crossing in addition to the actual pulse width of 5% of the period, which introduces a ±5% error around the actual zero crossing. It has been observed that this level of accuracy is not sufficient and that PLC systems would be improved by further restricting the zero crossing detector.

Suppose ±x % is the error in the zero crossing phase detection. This includes the error in first detecting the actual zero crossing of the waveform, which may be as much as ±10% under some proposals. In addition, the error x includes ±2.5%, which is half of the 5% representing the pulse width. Accordingly, the total error may be as high as ±12.5% under some recommendations (i.e., a ±10% detection error plus a ±2.5% zero crossing output pulse error). These errors will occur at both the transmitter and receiver nodes. As a result, there will be a ±x % error at the transmitter and another ±x % error at the receiver. This implies that the total deviation from the transmitter zero crossing detection to the receiver zero crossing detection to be ±2x %.

The gap between two consecutive phases is 33% of the total period. A total of 33% spacing between the phases implies that the total error between the transmitter and the receiver should be ±16.5% (i.e., half of the spacing). This implies that the 2x<16.5%, which simplifies to x<8.25%. However, under current PHY/MAC 500 assumptions, the value of x is 12.5%. This raises that possibility that—even though the transmitter and receiver are on the same phase—they may confuse each other as being on different phases. For example, if the zero crossing is detected +12.5% late at the transmitter and −12.5% early at the receiver, then the total error will be 25% of the total period. This may appear to the receiver that it is on a different phase from the transmitter since it is close to the 33% offset between the three phases on the AC mains.

Based on this analysis, the desired accuracy for the PLC zero crossing detector should be set at ±5% instead of the proposed ±10%. This will ensure that total error x, including the pulse width, is ±7.5% (i.e., a ±5% detection error plus a ±2.5% zero crossing output pulse error). An error of 7.5% is less than 8.25% and, therefore, the zero crossing detection should not make the transmitter and receiver appear to be on different phases.

The PDC field in the FCH is a one-byte field. This provides a resolution of up to 10/256 ms or 8.33/256 ms depending on whether the network uses 50 Hz or 60 Hz, respectively. The overall error introduced by the PDC field is quite small (on the order of 0.4%). If the PDC field error is included with the 7.5% suggested total error limit, then the total error would be 7.9%, which is still less than 8.25% and, therefore, provides sufficient accuracy.

Accordingly, the nodes in a PLC network should operate according to the following additional parameters.

The MAC and PHY of a node generate a zero crossing detection signal.

All devices in the PLC system, including meters and concentrators, have an internal timer that is synchronized to a zero crossing detector.

The PLC devices have a zero crossing detector that delivers an output pulse such that the pulse width is 5% of the total period.

The zero crossing detector output pulse should start with a time deviation of no more than ±5% of the power line time cycle from the actual zero crossing.

The reference packet location that is used for the calculation of the phase detection in both transmit and receive nodes is the first sample of the PHY FCH. This PDC value may be embedded in an FCH field in frames sent from the transmitter. The PDC value from the transmitter represents the interval between the previous zero crossing time and the start of the FCH in the current frame.

An eight-bit phase detection counter counts from 0 to 255 in one-half period of the mains, which means that the counter's ticks represent a time resolution of 10/255 ms on a 50 Hz main and 8.33/255 ms on a 60 Hz main.

The receiving nodes locally calculate a previous zero crossing interval with respect to start of the FCH in frames received from the transmitter. That is, the receiving nodes detect a zero crossing and then increment a local phase detection counter until the FCH in a frame is received. The value of the counter when the FCH of the received frame arrives is the previous zero crossing interval at the receiver node.

The PDC value carried in the FCH of received frames is compared with the local previous zero crossing information to determine the relative phase difference between the transmit and receive nodes.

FIG. 10 is a flowchart illustrating a method for calculating the PDC value that should be inserted in the FCH of a transmit frame. In step 1001, a transmit node detects a zero crossing on a phase on a PLC mains. In step 1002, the transmit node starts a phase detection counter when the zero crossing is detected. In step 1003, the transmit node determines when a frame will be transmitted. In step 1004, the transmit node determines an expected value of the phase detection counter when the first sample of the FCH of the frame will be transmitted. In step 1005, the phase detection counter value is inserted into the frame control header of the frame to be transmitted. Then, in step 1006, the frame is transmitted to a receive node.

FIG. 11 is a flowchart illustrating a method of determining if a receive node and a transmit node are on the same phase of a PLC mains. In step 1101, a receive node detects a zero crossing on a phase on a PLC mains. In step 1102, the receive node starts a phase detection counter. In step 1103, the receive node receives a frame from a transmit node. In step 1104, the receive node determines a local value of the phase detection counter when the first sample of the FCH of receive frame is received. In step 1105, the receive node identifies a transmit phase detection counter value in the frame control header of the received frame. In step 1106, the receive node then compares the local value of the phase detection counter to the transmit phase detection counter value from the received frame. Based on this comparison, the receive node determines if the receive node is on the same phase as the transmit node. If the local value of the phase detection counter is different from the transmit phase detection counter by more than a certain amount, then the nodes are determined to be on different phases. For example, if the difference corresponds to approximately 33% of the period of a waveform on the mains, then the nodes are on different phases.

In another embodiment, the procedure to determine the phase difference between transmitter and receiver is as follows. An eight-bit counter (Tx_PD_Counter) in the transmitter represents the time between the last zero-crossing prior to transmission of the packet FCH and the timestamp of the first FCH sample addition to the mains. This requires a transmitter to account for its implementation specific packet processing delay. The Tx_PD_Counter provides a time stamp which is placed in the FCH part of frame upon transmission of payload.

The counter value is calculated as follows:

$$Tx\_PD\_Counter = PD\_Counter + (transmission\_delay \times PD\_Counter\_Frequency)$$

where PD_Counter is the raw count read from the transmitter's PD_Counter before assembling FCH, transmission_delay is the transmitter's packet processing delay and PD_Counter_Frequency is the frequency of the PD_Counter (e.g., 25.5 kHz for 50 Hz and 30.61 kHz for 60 Hz main).

On the receiving node, once a packet is detected, the receiver implements an eight-bit counter (Rx_PD_Counter) to account for the time difference between the last zero crossing and the timestamp of the first sample of the first FCH symbol as received from the mains. This calculation requires the receiver to account for the time difference between the start of received packet's preamble and the instant packet is detected by the receiver.

The counter value is calculated as follows:

$$Rx\_PD\_Counter = PD\_Counter - (detection\_delay \times PD\_Counter\_Frequency)$$

where PD_Counter is the raw count read from the receiver's PD_Counter when a packet is detected, detection_delay is the time difference between receiver's packet detection and the time the first sample of FCH for the current packet was received from mains and PD_Counter_Frequency is as defined above.

Upon determining the RX_PD_Counter value, the receiver shall compute the delay between transmit and receive nodes, which is the difference between Tx_PD_Counter and Rx_PD_Counter values. A phase detection count differential between Tx and Rx is computed:

$$ZCTDifferential = (Rx\_PD\_Counter - Tx\_PD\_Counter).$$

Then a correction is applied to the ZCTDifferential, if necessary when the reference zero crossing for the transmitter and the receiver phase detection calculations are not the same. This will result in the above calculation to have a negative result:

If (ZCTDifferential<0)
    ZCTDifferential=ZCTDifferential+255.

The phase differential shall be computed as:

$$Phase\_Differential = floor(ZCTDifferential/60\_Degrees\_PD\_Counter),$$

where 60_Degrees_PD_Counter is the power-line main voltage 60_degree phase measured using an eight-bit counter operating at the PD_Counter_Frequency. This count value is equal to 85 for both 50 Hz and 60 Hz main.

Using the Phase_Differential calculated above, the AC phase is detected as:
  a) If (Phase_Differential=0) then TX_RX_IN_PHASE,
  b) If (Phase_Differential=1) then RX_LEAD_TX_120_DEGREES,
  c) If (Phase_Differential=2) then TX_LEAD_RX_120 DEGREES.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
    performing, by a power line communication (PLC) device,
        starting a phase detection counter (PDC) upon detecting a zero crossing on a phase of an AC mains;
        generating a zero crossing pulse upon detection of the zero crossing, a center of the zero crossing pulse occurring within an error limit of an actual zero crossing on the AC mains, the zero crossing pulse used to start the PDC;
        determining a PDC value at a frame transmission time, the PDC value representing a duration between the zero crossing and an initial transmission of a designated segment within a frame; and
        creating the frame for transmission to a remote PLC device, the frame comprising the PDC value.

2. The method of claim 1, wherein the designated segment is selected from a start of a preamble, a PHY frame control header (FCH), and a data payload.

3. The method of claim 1, wherein a period on the AC mains is determined by zero crossings of a waveform carried on the AC mains phase, the method further comprising:
    generating the zero crossing pulse with an error limit that is ±5% of period on the AC mains.

4. A method comprising:
    performing, by a power line communication (PLC) device,
        starting a phase detection counter (PDC) upon detecting a zero crossing on a phase of an AC mains;

generating a zero crossing pulse upon detection of the zero crossing, a center of the zero crossing pulse occurring within an error limit of an actual zero crossing on the AC mains, the zero crossing pulse used to start the PDC;

receiving a frame from a remote PLC device, the frame comprising a transmit PDC value;

determining a receive PDC value at a frame reception time, the receive PDC value representing a duration between the zero crossing and the start of a PHY frame control header transmission in the received frame; and determining a PDC difference between the receive PDC value and the transmit PDC value.

5. The method of claim 4, further comprising:
determining whether the PLC device and the remote PLC device are on a same AC mains based upon the PDC difference.

6. The method of claim 4, further comprising:
determining that the PLC device and the remote PLC device are on a same AC mains when the PDC difference is below a predetermined threshold.

7. The method of claim 4, further comprising:
determining that the PLC device and the remote PLC device are not on a same AC mains when the PDC difference is above a predetermined threshold.

8. The method of claim 4, wherein a period on the AC mains is determined by zero crossings of a waveform carried on the AC mains phase, the method further comprising:
generating the zero crossing pulse with an error limit that is ±5% of period on the AC mains.

9. A power line communication (PLC) device, comprising:
a processor; and
a memory coupled to the processor, the memory configured to store program instructions executable by the processor to cause the PLC device to:
start a phase detection counter (PDC) upon detecting a zero crossing on a phase of an AC mains;
generate a zero crossing pulse upon detection of the zero crossing, a center of the zero crossing pulse occurring within an error limit of an actual zero crossing on the AC mains, the zero crossing pulse used to start the PDC;
determine a PDC value at a frame transmission time, the PDC value representing a duration between the zero crossing and the start of a PHY frame control header transmission in a frame; and
create the frame for transmission to a remote PLC device, the frame comprising the PDC value.

10. The method of claim 9, wherein a period on the AC mains is determined by zero crossings of a waveform carried on the AC mains phase, the method further comprising:
generating the zero crossing pulse with an error limit that is ±5% of period on the AC mains.

11. A power line communication (PLC) device, comprising:
a processor; and
a memory coupled to the processor, the memory configured to store program instructions executable by the processor to cause the PLC device to:
start a phase detection counter (PDC) upon detecting a zero crossing on a phase of an AC mains;
generate a zero crossing pulse upon detection of the zero crossing, the zero crossing pulse representing the occurrence of the zero crossing to an accuracy of ±5%, the zero crossing pulse used to start the PDC;
receive a frame from a remote PLC device, the frame comprising a transmit PDC value;
determine a receive PDC value at a frame reception time, the receive PDC value representing a duration between the zero crossing and the start of a PHY frame control header transmission in the received frame; and
determine a PDC difference between the receive PDC value and the transmit PDC value.

12. The method of claim 11, the program instructions further causing the PLC device to:
determine whether the PLC device and the remote PLC device are on a same AC mains based upon the PDC difference.

13. The method of claim 11, the program instructions further causing the PLC device to:
determine that the PLC device and the remote PLC device are on a same AC mains when the PDC difference is below a predetermined threshold.

* * * * *